(12) United States Patent
Hopkins (10) Patent No.: US 8,909,664 B2
(45) Date of Patent: Dec. 9, 2014

(54) SYSTEM AND METHOD FOR CREATING A LIST OF SHARED INFORMATION ON A PEER-TO-PEER NETWORK

(75) Inventor: Samuel P. Hopkins, Freedom, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 524 days.

(21) Appl. No.: 12/082,407

(22) Filed: Apr. 10, 2008

(65) Prior Publication Data

US 2008/0263013 A1    Oct. 23, 2008

Related U.S. Application Data

(60) Provisional application No. 60/923,042, filed on Apr. 12, 2007.

(51) Int. Cl.
*G06F 17/30* (2006.01)
*G06Q 20/10* (2012.01)
*G06Q 30/06* (2012.01)
*H04L 29/08* (2006.01)

(52) U.S. Cl.
CPC .......... *G06F 17/30209* (2013.01); *G06Q 20/10* (2013.01); *G06Q 30/06* (2013.01); *H04L 67/22* (2013.01)
USPC ........................................................ 707/763

(58) Field of Classification Search
CPC ... G06F 21/577; G06F 21/554; G06F 21/552; G06F 2221/2119; G06F 21/566; G06F 21/62; G06F 2201/86; G06F 2201/875; G06F 17/30985; G06F 17/30209
USPC ............... 707/999.003, 3, E17.032, E17.135, 707/763; 705/39
See application file for complete search history.

(56) References Cited

U.S. PATENT DOCUMENTS 111,604 A    2/1871   Bailey
5,949,760 A  9/1999   Stevens et al.
5,987,011 A  11/1999  Toh
(Continued)

FOREIGN PATENT DOCUMENTS

CN    101606143    12/2009
EP    1107512 A1   6/2001
(Continued)

OTHER PUBLICATIONS

Feb. 26, 2009, International Search Report, PCT/US2008/004614.
(Continued)

*Primary Examiner* — Shiow-Jy Fan
(74) *Attorney, Agent, or Firm* — Cesari and McKenna, LLP (57) ABSTRACT

Today information Peer-to-Peer networks sometimes share improper information. Embodiments of the invention solve this problem by creating a list of shared information for analysis. In particular, a method or corresponding apparatus of an example embodiment includes a network node to obtain one or more searches from a Peer-to-Peer network. Next, the network node compares the one or more searches to one or more criteria. After comparing, the network node updates the one or more criteria to include variations of the one or more searches. Further, the network node issues the one or more searches based on the updated criteria. Next, the network node determines resultant information associated with the one or more searches. After determining, the network node creates a list of the resultant information for analysis. Using the list, an operator or software logic can analyze the resultant information to identify patterns and, in turn, identify improper information sharing.

14 Claims, 8 Drawing Sheets

(56) References Cited

U.S. PATENT DOCUMENTS

| | | | |
|---|---|---|---|
| 6,069,896 A | 5/2000 | Borgstahl et al. | |
| 6,076,088 A | 6/2000 | Paik et al. | |
| 6,205,146 B1 | 3/2001 | Rochberger et al. | |
| 6,453,312 B1* | 9/2002 | Goiffon et al. | 1/1 |
| 6,611,196 B2 | 8/2003 | Mynatt et al. | |
| 6,668,289 B2 | 12/2003 | Cheng et al. | |
| 6,732,180 B1 | 5/2004 | Hale et al. | |
| 6,839,769 B2 | 1/2005 | Needham et al. | |
| 6,855,660 B2 | 2/2005 | Tsou et al. | |
| 6,918,113 B2 | 7/2005 | Patel et al. | |
| 6,950,821 B2 | 9/2005 | Faybishenko et al. | |
| 6,965,591 B1 | 11/2005 | Roy | |
| 6,983,320 B1 | 1/2006 | Thomas et al. | |
| 7,003,514 B2 | 2/2006 | Dutta et al. | |
| 7,010,534 B2 | 3/2006 | Kraft | |
| 7,027,994 B2 | 4/2006 | Verdi et al. | |
| 7,035,653 B2 | 4/2006 | Simon et al. | |
| 7,089,301 B1 | 8/2006 | Labio et al. | |
| 7,120,145 B2 | 10/2006 | Ohba et al. | |
| 7,120,619 B2 | 10/2006 | Drucker et al. | |
| 7,174,382 B2 | 2/2007 | Ramanathan et al. | |
| 7,177,295 B1 | 2/2007 | Sholander et al. | |
| 7,206,841 B2 | 4/2007 | Traversat et al. | |
| 7,308,445 B2 | 12/2007 | Bharat et al. | |
| 7,318,092 B2 | 1/2008 | Sutler | |
| 7,327,683 B2 | 2/2008 | Ogier et al. | |
| 7,418,455 B2 | 8/2008 | Fan et al. | |
| 7,441,180 B1 | 10/2008 | Kaczmarek et al. | |
| 7,574,523 B2 | 8/2009 | Traversat et al. | |
| 7,600,033 B2 | 10/2009 | Bauer et al. | |
| 7,703,040 B2 | 4/2010 | Cutrell et al. | |
| 2001/0003191 A1 | 6/2001 | Kovacs et al. | |
| 2001/0037325 A1 | 11/2001 | Bidernman et al. | |
| 2001/0045949 A1 | 11/2001 | Chithambaram et al. | |
| 2002/0044549 A1 | 4/2002 | Johansson et al. | |
| 2002/0059204 A1* | 5/2002 | Harris | 707/3 |
| 2002/0065832 A1 | 5/2002 | Mack | |
| 2002/0069089 A1 | 6/2002 | Schmidt | |
| 2002/0073204 A1 | 6/2002 | Dutta et al. | |
| 2002/0087885 A1 | 7/2002 | Peled et al. | |
| 2002/0138471 A1 | 9/2002 | Dutta et al. | |
| 2002/0143989 A1 | 10/2002 | Christian et al. | |
| 2002/0152262 A1 | 10/2002 | Arkin et al. | |
| 2002/0161844 A1 | 10/2002 | Overtoom | |
| 2002/0181395 A1 | 12/2002 | Foster et al. | |
| 2002/0184310 A1 | 12/2002 | Traversat et al. | |
| 2002/0188735 A1 | 12/2002 | Needham et al. | |
| 2003/0005035 A1 | 1/2003 | Rodgers | |
| 2003/0037167 A1 | 2/2003 | Garcia-Luna-Aceves et al. | |
| 2003/0050966 A1 | 3/2003 | Dutta et al. | |
| 2003/0050980 A1 | 3/2003 | Dutta et al. | |
| 2003/0055892 A1 | 3/2003 | Huitema et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0126136 A1 | 7/2003 | Omoigui | |
| 2003/0126199 A1 | 7/2003 | Kadri et al. | |
| 2003/0135495 A1 | 7/2003 | Vagnozzi | |
| 2003/0145093 A1* | 7/2003 | Oren et al. | 709/229 |
| 2003/0182428 A1 | 9/2003 | Li et al. | |
| 2003/0191828 A1 | 10/2003 | Ramanathan et al. | |
| 2003/0195852 A1 | 10/2003 | Campbell et al. | |
| 2003/0202468 A1 | 10/2003 | Cain et al. | |
| 2003/0208621 A1 | 11/2003 | Bowman | |
| 2003/0212710 A1 | 11/2003 | Guy | |
| 2004/0030651 A1 | 2/2004 | Kim et al. | |
| 2004/0034652 A1 | 2/2004 | Hofmann et al. | |
| 2004/0039921 A1 | 2/2004 | Chuang | |
| 2004/0044790 A1 | 3/2004 | Loach et al. | |
| 2004/0044996 A1 | 3/2004 | Atallah | |
| 2004/0098370 A1* | 5/2004 | Garland et al. | 707/1 |
| 2004/0098377 A1* | 5/2004 | Kraft | 707/3 |
| 2004/0103297 A1 | 5/2004 | Risan et al. | |
| 2004/0111604 A1 | 6/2004 | Fournier | |
| 2004/0122958 A1 | 6/2004 | Wardrop | |
| 2004/0133571 A1 | 7/2004 | Horne et al. | |
| 2004/0139211 A1 | 7/2004 | Baker et al. | |
| 2004/0143842 A1 | 7/2004 | Joshi | |
| 2004/0148275 A1 | 7/2004 | Achlioptas | |
| 2004/0148434 A1 | 7/2004 | Matsubara et al. | |
| 2004/0153472 A1 | 8/2004 | Rieffanaugh | |
| 2004/0153658 A1 | 8/2004 | Gunyakti et al. | |
| 2004/0157641 A1 | 8/2004 | Chithambaram et al. | |
| 2004/0158630 A1 | 8/2004 | Chang et al. | |
| 2004/0196784 A1 | 10/2004 | Larsson et al. | |
| 2004/0218532 A1 | 11/2004 | Khirman | |
| 2004/0220926 A1* | 11/2004 | Lamkin et al. | 707/3 |
| 2004/0230572 A1 | 11/2004 | Omoigui | |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260761 A1 | 12/2004 | Leaute et al. | |
| 2004/0260801 A1 | 12/2004 | Li | |
| 2005/0028012 A1 | 2/2005 | Amamiya et al. | |
| 2005/0038898 A1 | 2/2005 | Mittig et al. | |
| 2005/0043548 A1 | 2/2005 | Cates | |
| 2005/0060297 A1* | 3/2005 | Najork | 707/3 |
| 2005/0080858 A1 | 4/2005 | Pessach | |
| 2005/0091167 A1 | 4/2005 | Moore et al. | |
| 2005/0091202 A1 | 4/2005 | Thomas | |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0119998 A1* | 6/2005 | Greco et al. | 707/3 |
| 2005/0125374 A1 | 6/2005 | Curtis et al. | |
| 2005/0125673 A1 | 6/2005 | Cheng et al. | |
| 2005/0144288 A1 | 6/2005 | Liao | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 | 8/2005 | Dutta et al. | |
| 2005/0203851 A1 | 9/2005 | King et al. | |
| 2005/0203892 A1* | 9/2005 | Wesley et al. | 707/3 |
| 2005/0229243 A1 | 10/2005 | Svendsen et al. | |
| 2005/0229255 A1 | 10/2005 | Gula et al. | |
| 2005/0265259 A1 | 12/2005 | Thubert et al. | |
| 2005/0267945 A1 | 12/2005 | Cohen et al. | |
| 2006/0020814 A1* | 1/2006 | Lieblich et al. | 713/182 |
| 2006/0026682 A1* | 2/2006 | Zakas | 726/22 |
| 2006/0029093 A1 | 2/2006 | Van Rossum | |
| 2006/0034177 A1 | 2/2006 | Schrempp | |
| 2006/0039297 A1 | 2/2006 | McNab | |
| 2006/0117372 A1 | 6/2006 | Hopkins | |
| 2006/0136837 A1 | 6/2006 | Ben-Shachar et al. | |
| 2006/0209819 A1 | 9/2006 | Jennings et al. | |
| 2006/0248062 A1 | 11/2006 | Libes et al. | |
| 2007/0124721 A1 | 5/2007 | Cowing et al. | |
| 2007/0162463 A1 | 7/2007 | Kester et al. | |
| 2008/0140780 A1 | 6/2008 | Hopkins | |
| 2009/0024618 A1 | 1/2009 | Fan et al. | |
| 2011/0065595 A1 | 3/2011 | Hopkins | |

FOREIGN PATENT DOCUMENTS

| | | |
|---|---|---|
| JP | 2010-509674 | 3/2010 |
| WO | WO 2003/009524 | 1/2003 |
| WO | WO 2005/074229 A1 | 8/2005 |
| WO | WO 2005/074230 A2 | 8/2005 |
| WO | WO2006/110823 A2 | 10/2006 |
| WO | WO 2006/124027 A1 | 11/2006 |
| WO | WO2008/057509 A2 | 5/2008 |

OTHER PUBLICATIONS

Feb. 26, 2009, Written Opinion of the ISA, PCT/US2008/004614.

Hessing, Steven, "Peer to Peer Messaging Protocol," Internet-Draft, Apr. 2002, pp. 1-57.

Lindemann, C., et al., "A Distributed Search Service for Peer-to-Peer File Sharing in Mobile Applications," *Peer-to-Peer Computing, 2002, Proceedings of the Second International Conference on Peer-to-Peer Computing*, Sep. 5-7, 2002.

(56) References Cited

OTHER PUBLICATIONS

Mondal, A., et al., "Effective load-balancing of peer-to-peer systems," Online, Mar. 2002, XP002299388.
Oram, A., "Peer-to-Peer: Harnessing the Power of Disruptive Technologies," Ch.10 Interoperability Through Gateways, Mar. 2001, p. 381-392.
Shi, W., et al., "Tuxedo: A Peer-to-Peer Caching System," Department of Computer Science, Wayne University.
Zhenyun Zhuang, et al. "Hybrid Periodical Flooding in Unstructured Peer-to-Peer Networks," Proceedings of the 2003 International Conference on Parallel Proceeding.
Hwang, J., and Aravamudham, P., "Proxy-Based Middleware Services for Peer-to-Peer Computing in Virtually Clustered Wireless Grid Networks," School of Information Studies, Syracuse University, CST 4-291.
United States House of Representatives Committee on Government Reform—Staff Report Prepard for Rep. Tom Davis and Rep. Henry A. Waxman, "File-Sharing Programs and Peer-to-Peer Networks Provacy and Security Risk," May 13, 2003, pp. 1-12.
United States General Accounting Office, Report to the Chairman and Ranking Minority Member, Committee on Government Reform, House of Representatives, "File Sharing Programs-Peer-To-Peer Networks Provide Ready Access to Child Pornography," Feb. 2003, pp. 1-32.
Couch, William, "Peer-To-Peer File-Sharing Networks: Security Risk," SANS Institute InfoSec Reading Room, 2002, pp. 1-11.
Davidson, Alan, "Peer-To-Peer File Sharing Privacy and Security," Center for Democracy and Technology, May 15, 2003, pp. 1-16.
AA-Feb. 2002—File Sharing Activity Part 1 of 2—Security Implications of Using Peer-to-Peer File Sharing Software, May 12, 2002, pp. 1-5.
Phemus, "Secret Manual for Downloading: Final Second Part of Answers to Questions for Downloading", PC Japan, vol. 5, 11, pp. 174-179, Nov. 1, 2000.
International Search Report and Written Opinion of the ISA mailed May 14, 2008 in connection with PCT Application No. PCT/US07/23321.
International Search Report and Written Opinion of the ISA mailed Jun. 15, 2005 in connection with PCT Application No. PCT/US05/001622.
International Search Report and Written Opinion of the ISA mailed Sep. 12, 2007 in connection with PCT Application No. PCT/US06/13666.
Andersen, S., et al., Changes to Functionality in Microsoft Windows XP Service Pack 2 Part 2: Network Protection Technologies, Online, Sep. 15, 2004, pp. 1-56, XP002330123.
Brandon Wiley, Freenet, "Inoperability Through Gateways," Chapter 19, pp. 381-392.
Findeli, M., "Peer-to-Peer (P2P) Networkgin," On Line, Jul. 1, 2001, pp. 1-21.
Goel, S., et al., "A Resilient Network That Can Operate Under Duress: To Support Communication Between Government Agencies during Crisis Situations," IEEE, Proceedings of the $37^{th}$ Animal Hawaii International Conference pp. 1-11, Jan. 2004.
Kim, K., and Park , D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?hl—en&lr=&q=cache:Cljbt8-S9ckJ:ideal.cecs.missouri.edu/IMC/papers/377PD. . . .
Liu, Jiangchuan, et al., "Distributed Distance Measurement for Large-Scale Networks," Computer Networks 41 (2003) pp. 177-192.

Marmor, Michael S., "Make the P2P Lead with Toadnode," www.webtecniques.com, Dec. 2000, pp. 44-49.
Markatos, E.P., Tracing a large-scale peer to peer system: an hour in the life of Gnutella, Cluster Computing and the Grid $2^{nd}$ IEEE/ACM International Symposium CCGRID, 2002 Berlin, Germany, May 21-24, 2002, IEEE Comput. Soc., US, pp. 65-74.
Scarlata, V., et al., "Responder Anonymity and Anonymous Peer-to-Peer File Sharing, " Proceedings of the International Conference on Network Protocols, Nov. 11, 2001, pp. 272-280.
Siu Man Lui, et al., "Interoperability of Peer-To-Peer File Sharing," ACM SIGecom Exchanges, vol. 3, No. 3, Aug. 2002, pp. 25-33.
*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.
*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.
*Tiversa, Inc., et al v. Cohen & Grigsby, P.C.*, Court of Common Pleas of Allegheny County, Pennsylvania, "First Amended Complaint," 90 pages, dated Nov. 5, 2007.
*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.
*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.
*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.
*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 29 pages, dated Jan. 30, 2008.
*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.
Ueda, et al., "Peer-to-Peer Network Topology Control within a Mobile Ad-hoc Network," 2003 IEEE, pp. 243-247.
Xiao, et al., "Mutual Anonymity Protocols for Hybrid Peer-to-Peer Systems," Proceedings of the $23^{rd}$ International Conference on Distributed Computing Systems, May 19-22, 2003.
Zhu, et al., "SDQE: Towards Automatic Semantic Query Optimization in P2P Systems," *Information Processing & Management*, 42(1), pp. 222-236 Oct. 26, 2004.
Translation of First Official Action "Notice of Reason for Rejection" issued from the Japanese Patent Office on Mar. 26, 2012 for Japanese Patent Application No. 2010-503053, filed Apr. 10, 2008 for a System and Method for Creating a List of Shared Information on a Peer-To-Peer Network, submitted with comments by the Japanese Associate, 5 pages.
Kazuma Hatano, Proposal of the Retrieval Technique on Peer-to-Peer Network considered with multi-attribute of contents, IPSJ SIG Technical Reports, vol. 2004, No. 71, Information Processing Society of Japan, Japan, Jul. 13, 2004, pp. 199-205. No translation given.
Yuichi Ishikawa, A Peer-to-Peer File Locating Mechanism Using Keyword-Relationship, IEICE Technical Report, vol. 101, No. 717, The Institute of Electronics, Information and Communication Engineers, Japan, Mar. 8, 2002, pp. 143-150, no translation given.

* cited by examiner

FIG. 1A

Resultant Information

| 16 byte descriptor id | a payload descriptor id | Time to live value | a hops value | a payload lenght | Payload (e.g., file titles, TCP/IP port, an IP address, host speed, the result set with a file index, a file size, a file name, and a servent ID number |
|---|---|---|---|---|---|
| 107 | 119 | 137 | 142 | 147 | 152 |

Search Packet

| 16 byte descriptor id | a payload descriptor id | Time to live value | a hops value | a payload length (e.g., search term length) | Search Term | Minimum user speed |
|---|---|---|---|---|---|---|
| 205 | 210 | 215 | 220 | 225 | 230 | 235 |

2006 credit card
2006 credit card number
2007 credit card numbers
aa credit card application
aarons checking account
account access
account application
account application forms
account balances
account checking
account chq
account credit card
account information
account passwords
account passwords user id
account statement
account summary information
account summary july
account transfer
accounting financial gaap
accounting of credit card
accounts my passwords
accounts october september
accounts payable
accounts payable procedure
accounts receiveable
accounts with paperwork by
accredited credit cards
ad credit card authorization
addresses cards credit names
checking account activity
checking account fsnb
checking account info
checking account number
checking savings admin nv visa request
anthony pappa balance cd1
authorization credit card
authorization for credit card
authorization for payment form
authorization to debit account
auto payment
bank account
bank account access permission
bank account change
bank account number
bank account numbers
bank account password
bank account verification form
bank accounts
bank accounts details
bank accounts security codes
bank balance
bank credit card
bank credit card information
bank credit cards passwords
bank numbers card credit my
bank staffs credit cards only
capital accounts
capital accounts 31 dec04 inv
card account
card auth credit
card credit numbers
card payment
cards credit credit card
carte visa
cc pin
cc visa
cdn credit card auth
checking account

SYSTEM AND METHOD FOR CREATING A LIST OF SHARED INFORMATION ON A PEER-TO-PEER NETWORK

RELATED APPLICATION

This application claims the benefit of U.S. Provisional Application No. 60/923,042, filed Apr. 12, 2007. The entire teachings of the above application is incorporated herein by reference.

FIELD OF THE INVENTION

The present invention relates to locating information within connected network computers.

BACKGROUND OF THE INVENTION

A Peer-To-Peer network uses diverse connectivity between participants in a network and the cumulative bandwidth of network participants rather than conventional centralized resources. Peer-to-Peer networks are typically used for connecting nodes via largely ad hoc connections. Such networks are useful for many purposes. Sharing content files containing audio, video, data or anything in digital format is common, and real-time data, such as telephony traffic, is also passed using Peer-to-Peer networks. To access a Peer-to-Peer network for sharing content files, a user utilizes a Peer-to-Peer network software application, which is capable of connecting network computers.

SUMMARY OF THE INVENTION

A method or corresponding apparatus of an example embodiment includes a network node to obtain one or more searches from a Peer-to-Peer network. The network node compares the one or more searches to one or more criteria. After comparing, the network node updates the one or more criteria to include variations of the one or more searches. After updating, the network node issues the one or more searches based on the updated criteria. Next, the network node determines resultant information associated with the one or more searches. After determining, the network node creates a list of the resultant information for analysis. In an embodiment, the method or corresponding apparatus employs C, C++, .NET, or Visual Basic program code.

In an embodiment, the one or more criteria is one of the following: a predefined keyword, set of keywords, or a subset of keywords. Further, the one or more criteria can refer to an individual, organization, group, or other identifiable entity.

In an embodiment, the one or more searches are broadcast messages in a Peer-to-Peer network. In an embodiment, the network node compares the one or more searches to the one or more criteria uses one of the following: compare, intrastring, fuzzy logic match, or other comparison technique(s).

In an embodiment, the network node updates by employing account punctuation, pluralization, and other variations of the one or more criteria. In an embodiment, the network node is further configured to send a TCP/IP packet with the one or more searches to a network node.

In an embodiment, resultant information is an organization's name, information related to the organization, an individual's name, or information related to the individual.

In an embodiment, a list is stored in a database, a computer program, memory, or suitable storage device. In an embodiment, the network node is further configured to collect a fee for providing access to the list. In an embodiment, the network node is further configured to identify a security risk based on the one or more searches.

Other advantages of the present invention will become apparent from a perusal of the following detailed description of the embodiments of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3B is an example criteria according to an example embodiments of the invention;

DETAILED DESCRIPTION OF THE INVENTION

Today, organizations and individuals risk disclosing information that should not be shared. To lower this risk, an organization or an individual locates information and identifies what information is private (e.g., should not be disclosed). After identifying what information is private, the organization may take actions to prevent disclosure of the information. One way to prevent the improper information sharing is by monitoring searches made in a network, such as a Peer-to-Peer network, for phrases, terms, or one or more criteria relating to an industry, organization, or company, such as a company name or other nomenclature.

Figure 1A:
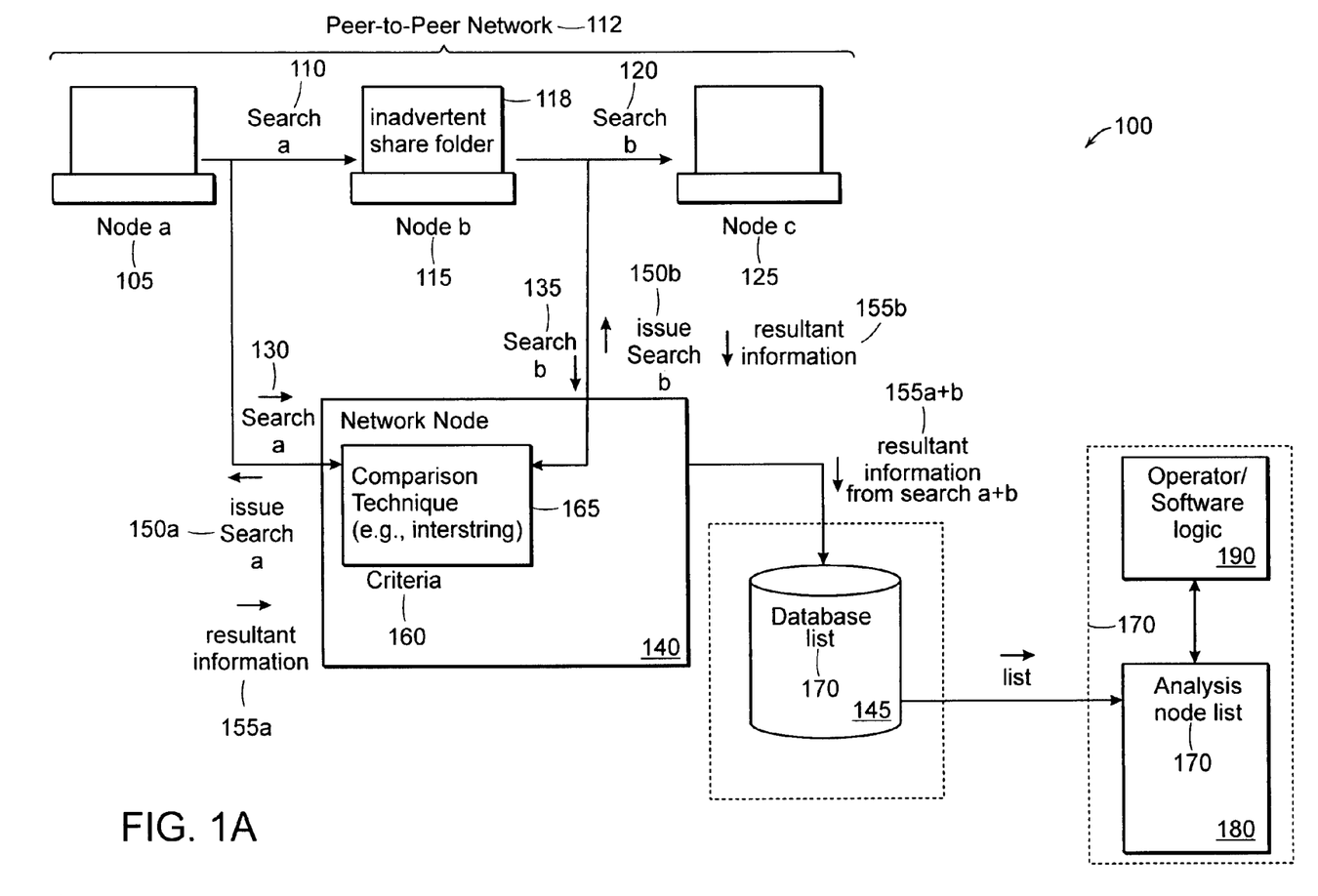
FIG. 1A is a block diagram depicting a communications network monitoring searches on a Peer-to-Peer network to create a list according to example embodiments of the invention.

FIG. 1A is a block diagram depicting a communications network 100 monitoring searches 110, 120 on a Peer-to-Peer network to create a list according to example embodiments of the invention. In particular, a network node 140 monitors searches issued on a Peer-to-Peer network 112. The Peer-to-Peer network 112 includes node a 105, node b 115, and node c 125, which are in communication with each other. In operation, node a 105 sends search 110 to node b 115. Similarly, node b 115 sends search b 120 to node c 125. For example, node a 105 and node b 115 may issue searches 110, 120 for the phrase "Acme Bank." Once the search is issued, the network node 140 obtains the searches 110, 120 from the Peer-to-Peer network 112, typically by obtaining a broadcast message associated with the searches 110, 120. After obtaining the searches 110, 120, the network node 140 compares the searches 110, 120 to one or more criteria 160 (e.g., a phrase) using a comparison technique, such as compare. If the one or more criteria 160 matches the searches 110, 120 (e.g., criteria is "AcmeBank"), the network node 140 updates the one or more criteria 160 to include variations (e.g., "Acme Banks") of the searches 110, 120. To do so, the network node 140 employs pluralization or other algorithms known in the art to determine these additional variations of the searches 110, 120.

After updating the criteria 160, the network node 140 issues new searches 150a-b based on the updated criteria. As a result, the network node 140 receives a response from the Peer-to-Peer network 112 and creates a list of the resultant information 155a-b from the new searches 150a-b and stores the resultant information 155a-b in a database 145 for analysis.

Figure 1B:
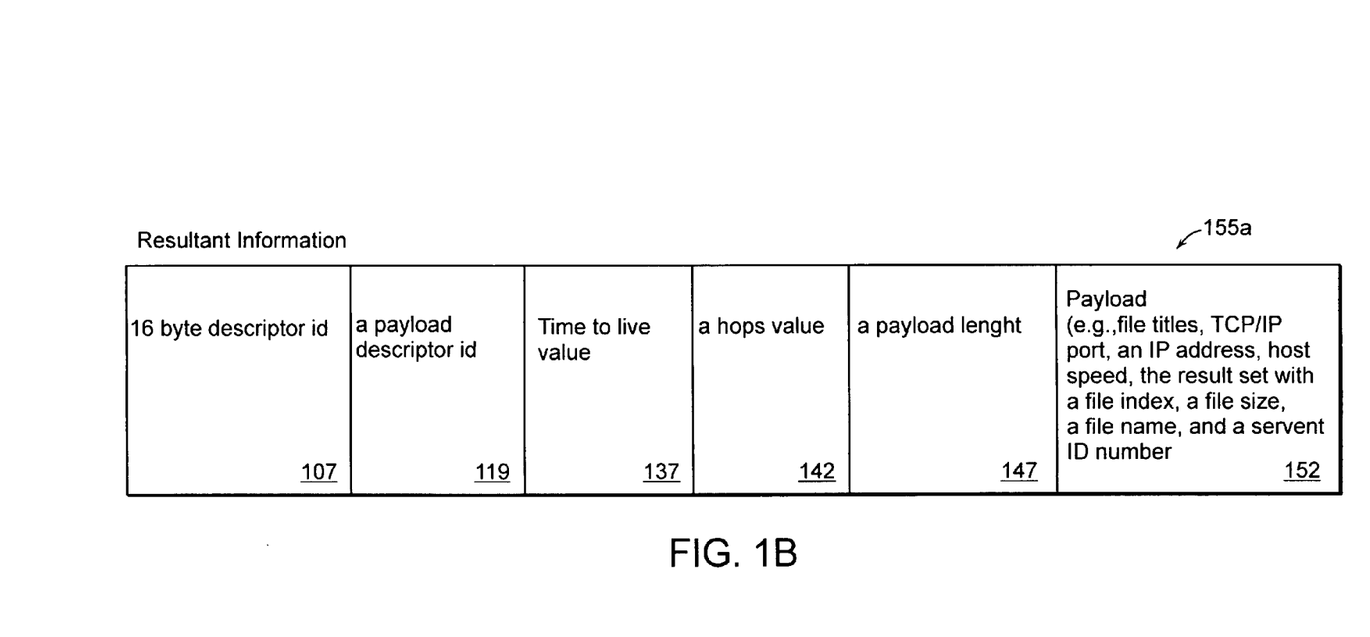
FIG. 1B is an example list of resultant information according to an example embodiments of the invention.

In a preferred embodiment, the network node 140 receives a response, including the resultant information 155a-b, from the Peer-to-Peer network 112. An example resultant information 155a is shown in FIG. 1B. In particular, FIG. 1B shows the resultant information 155a as a TCP/IP packet that contains contain a 16 byte descriptor id 107, a payload descriptor id 119, a time to live value (normally 3) 137, a hops value 142 (normally 0), a payload length 147, and a payload 152. The payload typically includes the number of file titles contained in the payload, the TCP/IP port, an IP address, host speed, the result set with a file index, a file size, a file name, and a servent ID number. In an embodiment, the resultant information can also include the name and size of a file, and the IP address of the computer that has the file. It should be understood that a servent is a peer-to-peer network node, which has the features of both a server and a client. Other configurations for the resultant information 155a are also possible.

Referring back now to FIG. 1A, an analysis node 180 may receive the list 170, which allows an operator or software logic 190 to identify patterns of searched information in the list 170. The software logic 190, for example, determines information, such as a shared folder that contains sensitive or private information, which would be improper to share. That is, the information may be shared inadvertently or by a malicious act or virus. For example, a person may inadvertently shared a dispute letter that contains personal information, such as a credit card number. A user may search for these dispute letters and acquire the credit card number. That is, the user may issue a search and receive a dispute letter, which relates to a credit card purchase for a credit card owner. In the dispute letter, the credit card owner includes the credit card number and/or other personal information. Thus, the user can now view and potentially use the credit card owner's credit card number and/or other personal information.

In other examples, the Peer-to-Peer network 112 software may have a software bug that permits the sharing of files or information. Likewise, a user's computer may have a virus or worm that connects to the Peer-to-Peer network 112 and shares information without the user's knowledge, such as inadvertent share folder 118 in node b 115. Regardless of the reason for sharing, a user can issue a search including terms that target an organization or individual, such as "Acme Bank dispute letter" or "John Smith credit card." Allowing access to sensitive or private information, via searching, can result in risks to an organization, national security, or other users.

It should be understood that embodiments of the invention are not limited to using a database, such as database 145, and embodiments of the invention can also store the list in a report, on the network node 140, or in some other suitable location or memory. Other configurations are also possible.

It should be further understood that other configurations of the Peer-to-Peer network 112 are also possible. For example, one or more nodes can be classified as main nodes and the other nodes can be classified as leaf nodes. A leaf node connects to main nodes and main nodes can connect to other main nodes. Thus, if a leaf node issues a search request, the leaf node sends the search request to a main node connects to the leaf node. Upon receiving the search request, the main node forwards the request to each leaf node and main nodes connected to the requesting main node. The receiving main node forwards each search request to each of the leaf nodes that they are in connection with. Embodiments of the present invention can also obtain resultant information from leaf nodes searches as well. Moreover, it should be understood that the analysis node 180 and software logic 190 are optional components of the communications network 100 and embodiments can be employed without these components.

Figure 2:
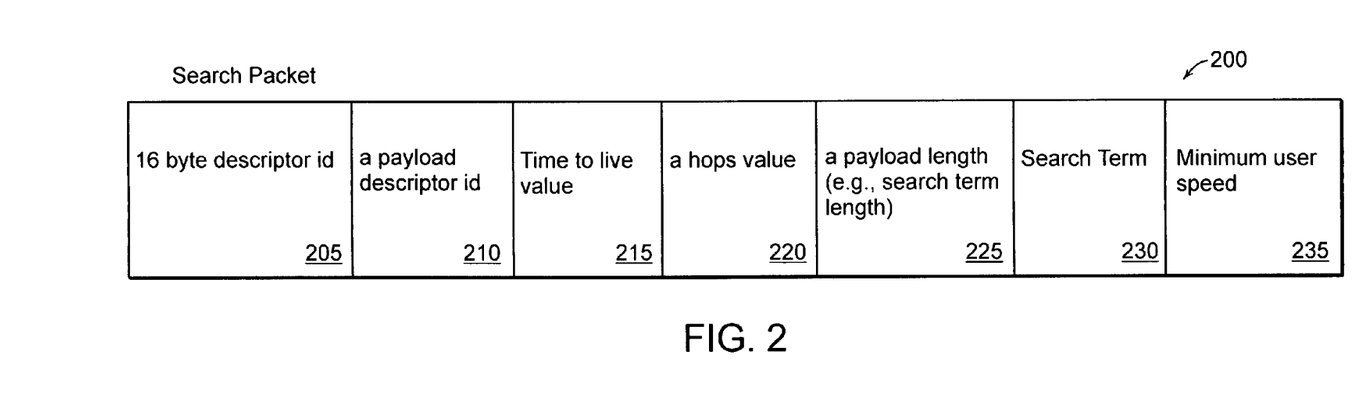
FIG. 2 is a block diagram depicting an example search packet according to example embodiments of the invention.

FIG. 2 is a block diagram depicting an example search packet 200 according to example embodiments of the invention. In particular, the search packet 200 contains a 16 byte descriptor id 205, a payload descriptor id 210, a time to live value 215, a hops value 220, a payload length of the search term 225, a search term 230, and a minimum speed the user accepts 235. In a preferred embodiment, a network node, such a network node 140 of FIG. 1, creates a report based on the searches in a search packet 200. The report can include a listing of all the searches that match criteria including duplicates. Alternatively, the report can include a listing of the search term 225 that matched the criteria without duplicates. For reports that include duplicates, a number corresponding to the number of searches a particular search term 225 can be stored. Using the number of searches for a particular search term 225 can be useful in determining a pattern as described below. In an embodiment, the report can also includes each search term 225 and a corresponding 16 byte descriptor id 205.

Figure 3A:
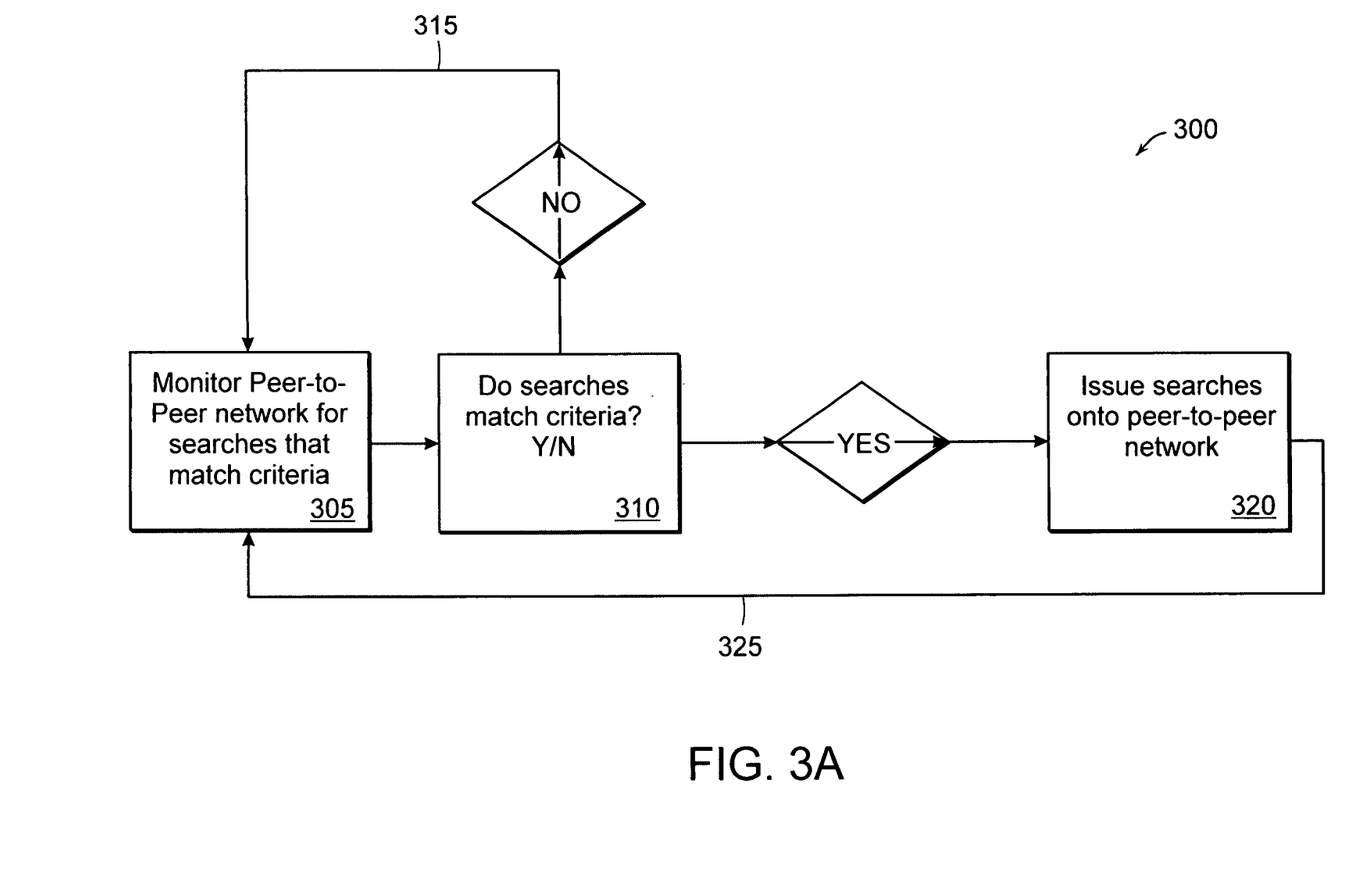
FIG. 3A is a flow diagram depicting issuing searches on a network according to an example embodiments of the invention.

FIG. 3A is a flow diagram depicting issuing searches on a network according to an example embodiment of the invention. In particular, FIG. 3A shows a process 300 for monitoring organization information, via monitoring searches, issuing searches, and obtaining a response. The process 300 monitors a Peer-to-Peer network for searches that match one or more criteria 305 by using a network node to obtain Peer-to-Peer network broadcast messages. In an preferred embodiment, the process uses comparison techniques, such as compare, a fuzzy logic match, or other comparison technique known in the art, via a programming language, such as C++ or Visual Basic. Using other programming languages or comparison techniques is also possible. In an example embodiment, the programming language considers account punctuation, such as abbreviations, and pluralization to either modify the search term, modify the one or more criteria, or add additional criteria search terms. For example, if a search term is "Acme Banks", the process remove the "s" at the end of "Banks" to expand the results. That is, the process 300 includes multiple criteria search terms, such as "Acme Bank" and "Acme Banks."

Consider the following example. The process 300 monitors a network for a search term or phrase (e.g., "Acme Bank") by extracting the search term from a Peer-to-Peer network search packet, such as search packet 200 of FIG. 2. After extracting the search term, the search term can be compared to criteria using compare, intrastring, fuzzy logic match, or other comparison technique(s). More specifically, the process 300 determines if the one or more criteria is matched 310. If there is no match, the process 300 returns to monitoring 315 for new searches, otherwise the process 300 continues. More specifically, the process 300 obtains or receives one or more searches from a Peer-to-Peer network relating to an organization (e.g., "Acme Bank") or individual. The process 300 compares the one or more searches one or more criteria. The one or more criteria, for example, may be a predefined keyword, set of keywords, or a subset of keywords and may be stored in a database, a computer program, a list, a report, memory, or other suitable storage device.

In an embodiment, an organization or other users defines the one or more criteria with search terms. For example, an organization defines the one or more criteria, which corresponding to an organization, such as a company name, address, brand name(s), name(s) of executive management, addresses, or other representative criteria (or keyword). Example criteria 350 is shown in FIG. 3B. More specifically, the example criteria 350 shows search terms issued by suspicious individuals on a network. After issuing the one or more searches, the process 300 returns to a monitoring phase 325. The example criteria 350 is typically a listing of terms or phrases that match the organizations keywords specified by human resources, consumer, agents, or a computer.

In an embodiment, the defining the one or more criteria can be manually entered by the organization or other user. In an embodiment, the process 300 monitors issued searches and matches the issued searches to existing criteria and adds the searches as additional criteria.

Continuing with FIG. 3A, if the criteria is matched, the process 300 issues one or more searches onto the Peer-to-Peer network 320. The process 300 issues searches by using one of the following: a Peer-to-Peer software application, a non Peer-to-Peer system, or a system that has access to a Peer-to-Peer node for issuing searches. In an embodiment, the searches are issued via a Transmission Control Protocol and an Internet Protocol (TCP/IP) packet. A TCP/IP packet typically contains a 16 byte descriptor identifier, a payload descriptor identifier of 128, a time to live value (normally 3), a hops value (normally 0), a payload length with the length of the search term, a search term, and a minimum speed a user is accepting.

Figure 4:
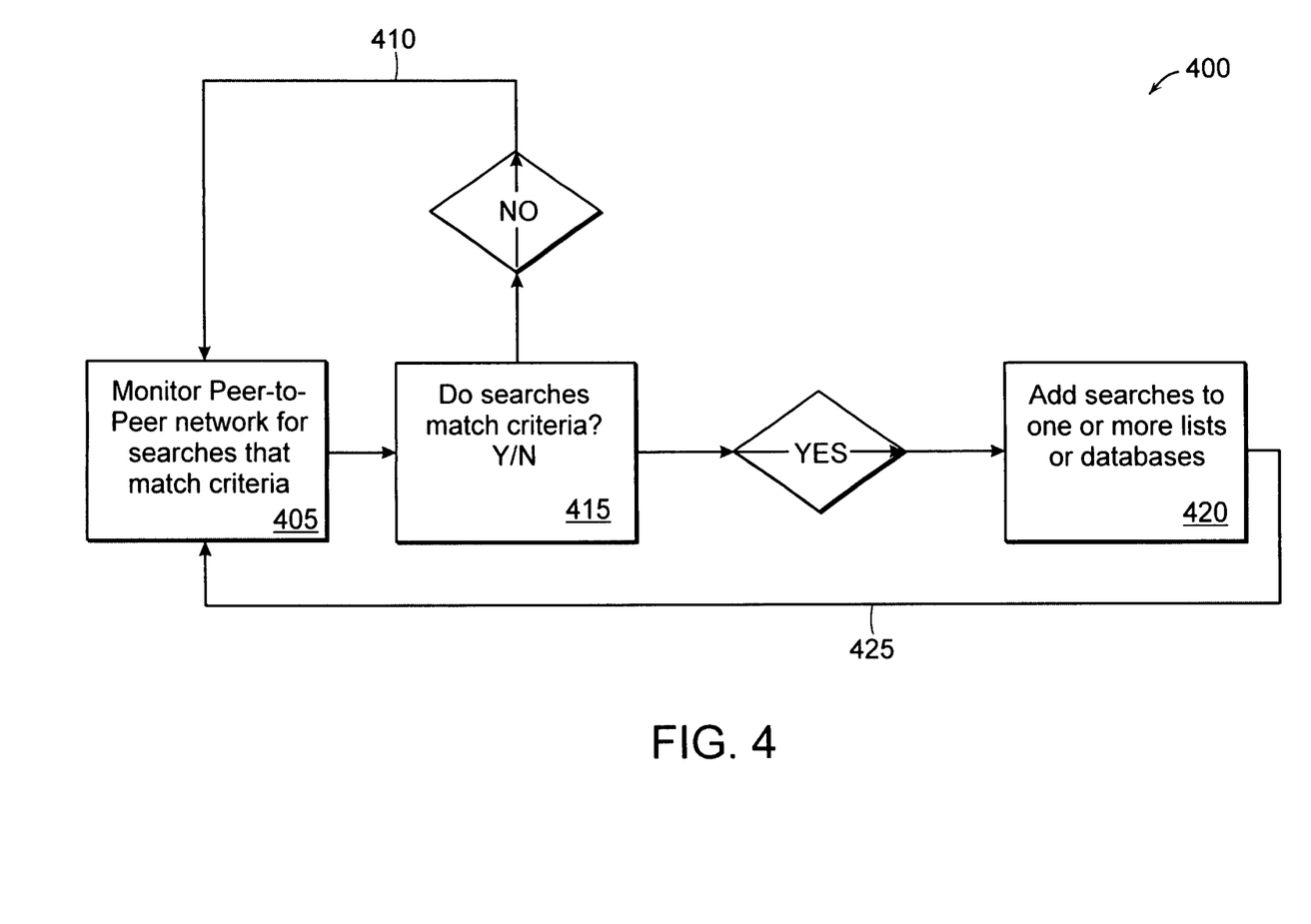
FIG. 4 is a flow diagram depicting adding searches to a database according to an example embodiments of the invention.

In an embodiment, a process 400 adds one or more searches to memory as illustrated in FIG. 4. The process 400 monitors a Peer-to-Peer network for one or more searches that match the one or more criteria 405. The process 400 determines if the one or more criteria matches 410. If there is a match, the process 400 adds the searches to a list 420. If the list contains an organization name related to a customer as provided in the criteria, the process 400 determines that the user may be malicious and targeting their customers. The process 400 determines such behavior exist by using metrics, such as the number of searches received or the complexity of the search. More specifically, if a user searches for the phrase "Acme Bank Statements," a determination is made that the user is attempting to find bank statement information. The process 400 adds the record of the searches (and/or the actual searches) to memory 400 and returns to a monitoring phase 425 to identify additional searches. If, however, there is no criteria match, the process 400 returns to a monitoring phase 410 without adding searches to memory.

Figure 5:
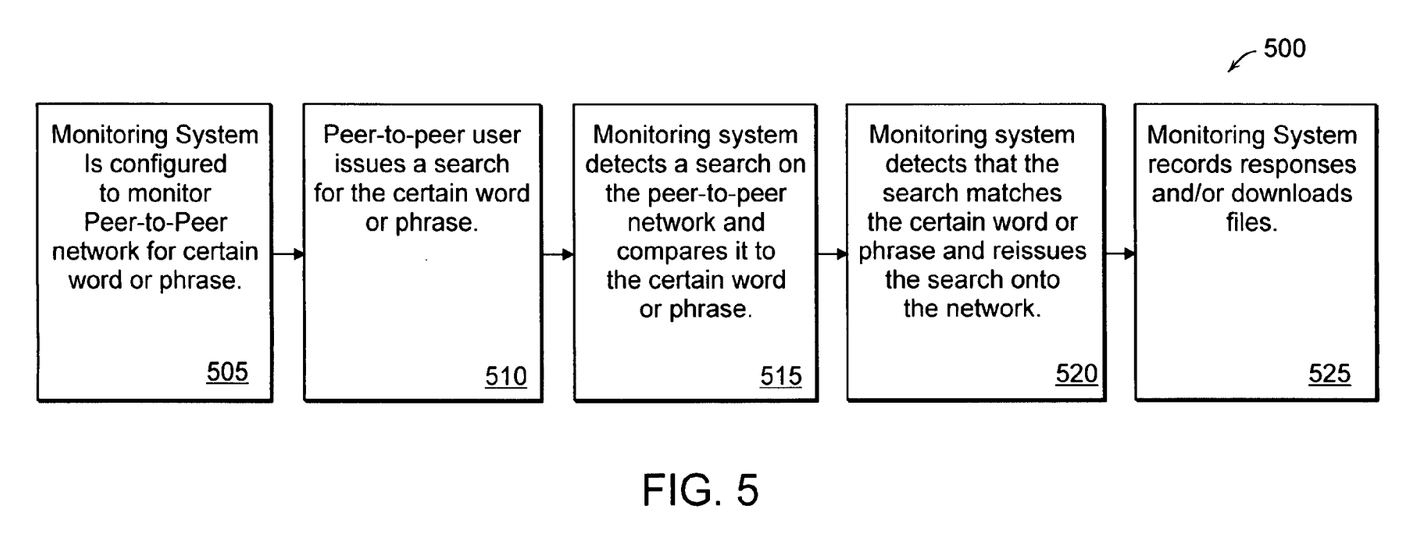
FIG. 5 is a flow diagram depicting an example monitoring process according to an example embodiments of the invention.

A monitor process 500 as shown in FIG. 5 allows an organization to protect against unwanted or improper information sharing. In a preferred embodiment, a monitor system in the monitor process 500 monitors a Peer-to-Peer network and monitors the Peer-to-Peer network for a word or phrase 505 based on a configuration. In an embodiment, the configuration can be manually entered by an operator of the monitor system or predetermined in some other manner. A Peer-to-Peer user issues a search for the word or phrase 510. In turn, the monitoring system detects a search on the Peer-to-Peer network and compares the search to the word or phrase 515. Further, the monitoring system detects that the search matches the certain word or phrase and issues the search onto the network 520. For example, by monitoring the searches of a "rogue" user, a bank records the search response to identify a rogue user in the future. Thus, the bank is capable of identifying if a potential problem may exist. The monitoring system may record responses to a database and/or download files that match the issued search in computer memory, a database, or on a printed media 525. In a preferred embodiment, the monitoring system can use TCP/IP to connect to the host and download the file. It should be understood that searches can be issued via TCP/IP packets or other transmission packet.

In an embodiment, the monitoring system issues a "Push" message, which instructs the file host to connect to the monitoring system and upload the file. Thus, the monitoring circumvents any host firewall preventing transfer of the message. A push message can be a TCP/IP packet that would contain a 16 byte descriptor id, a payload descriptor id of 64, a time to live value (normally 3), a hops value (normally 0), Payload length, and a payload. The payload includes a servent identifier, file index, IP address of the Monitoring System, and the TCP/IP port of the Monitoring System.

Figure 6:
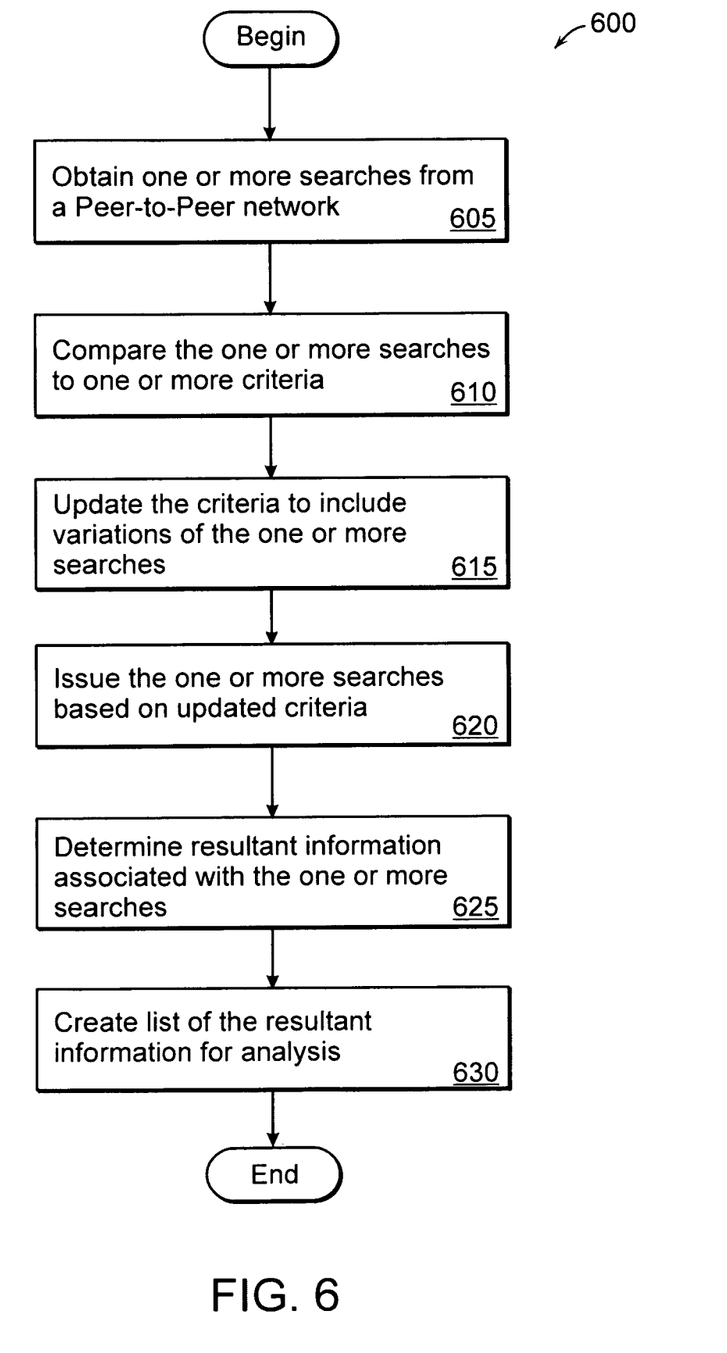
FIG. 6 is a flow diagram illustrating creating of a list of searched information on a Peer-to-Peer network according to example embodiments of the invention.

FIG. 6 is a flow diagram illustrating creating a list of searched information on a Peer-to-Peer network according to example embodiments of the invention. A process 600 obtains one or more searches from a Peer-to-Peer network at 605. At 610, the process 600 compares the one or more searches to one or more criteria to determine if there are any matches. At 615, the process 600 updates the one or more criteria to include variations or other permutations of the one or more searches. At 620, the process 600 issues the one or more searches to the network, based on updated criteria, to obtain resultant information. At 625, the process 600 determines the resultant information associated with the one or more searches. At 630, the process creates a list of the resultant information for analysis.

It should be understood that the resultant information can be in the form of a list, report, a database report, or other suitable presentation. Further, as explained above, software logic can be used to identify patterns in the searched/resultant information based on the one or more criteria. Alternatively, the resultant information can be reviewed by an analyst to identify any patterns/risks. For example, an analyst or software logic identifies a large number of searches relating to personal or business information for a particular executive in an organization in the resultant information. The large number of searches relating to this executive indicates a possible identity theft or other potential risk.

Figure 7:
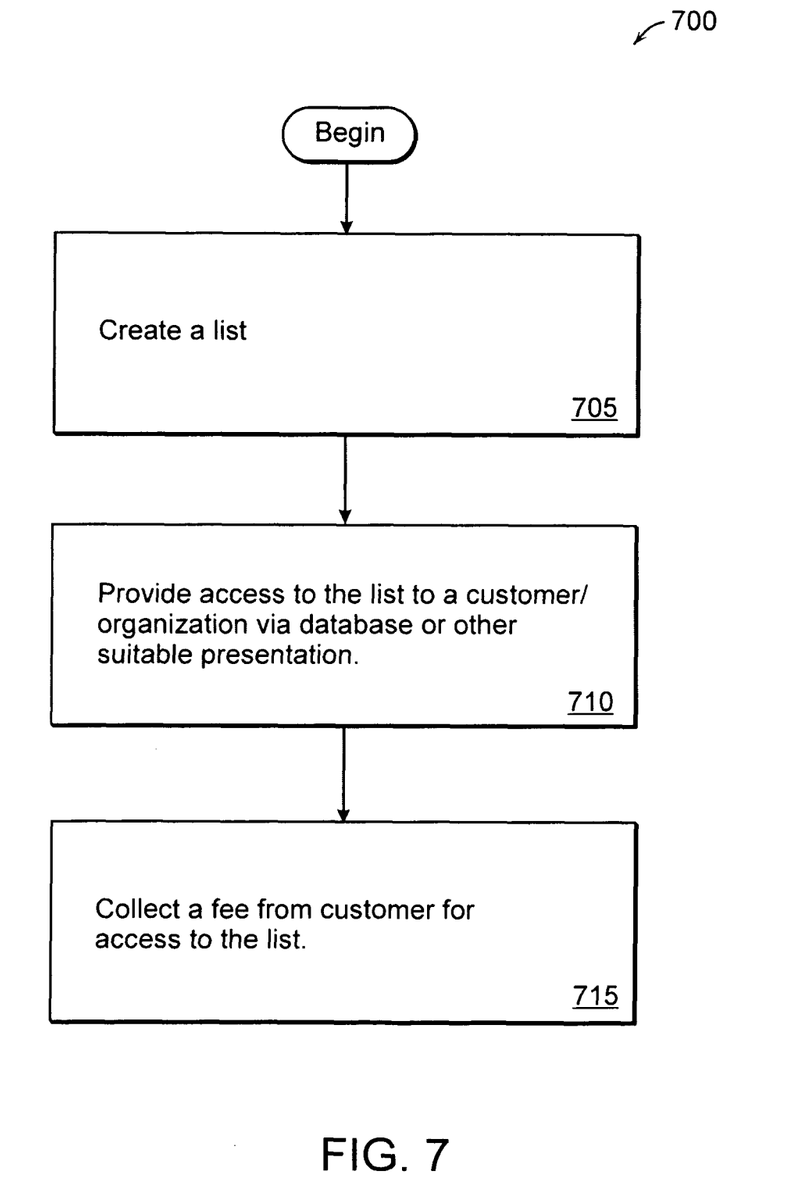
FIG. 7 is a flow diagram depicting providing a list to a customer for a fee in accordance with example embodiments of the invention.

FIG. 7 is a flow diagram depicting providing a list to a customer for a fee in accordance with example embodiments of the invention. For example, a process 700 creates a list, which may include searches results or other information as identified by one or more criteria. At 710, the process 700 provides access to the list to a customer/organization, via a database or other suitable presentation (e.g., a report). In a preferred embodiment, the customer receives access to the list by connecting to a database, such as database 145 of FIG. 1, and reviews the list. At 715, the process 700 collects a fee from the customer for access to the list. The fee may be collected on a subscription basis ranging from a one time, daily, weekly, monthly, or annual subscription basis, invoicing the organization for the fee, or collecting the fee on a prepayment basis. In an example embodiment, the fee may be a flat fee or to review the list, where a one time fee is charged for unlimited access to the list or for each access of the list. Other arrangements are also possible.

Using an embodiment of the invention, a hardware system may be used as a computer, thin appliance, ASIC based device or other similar device, which can be programmed with specific logic or programming code (e.g. software). The system connects with a physical network either directly or though the use of a gateway. Programming logic provides the device with the capability to transmit and receive on both physical networks and Peer-to-Peer networks. Examples of programming logic include a software program or hard-coded procedural information, such as information found on an ASIC based device.

It should be understood that any of the processes disclosed herein may be implemented in the form of hardware, firmware, or software. If implemented in software, the software may be processor instructions in any suitable software language and stored on any form of computer readable medium. The processor instructions are loaded and executed by a processor, such as a general purpose or application specific processor, that, in turn, performs the example embodiments disclosed herein.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
   obtaining one or more searches from one or more messages broadcast on a Peer-to-Peer network;
   determining if the one or more obtained searches match one or more criteria, in which the one or more criteria is one of: a predefined keyword, set of keywords, or a subset of keywords that is indicative of a suspicious individual who is searching for information referring to an individual organization, group, or other identifiable entity;
   in response to determining that the one or more obtained searches match the one or more criteria:
      updating the one or more criteria to include variations of the one or more obtained searches, the variations of the one or more obtained searches including account punctuation, pluralization, and other variations of the one or more searches,
      issuing one or more new searches to the Peer-to-Peer network based on the updated criteria, the one or more new searches being different from the one or more obtained searches,
      determining resultant information associated with the one or more new searches, and
      creating a list of the resultant information for analysis, the resultant information comprising one or more of: an organization's name, information related to the organization, an individual's name, information related to the individual; and
   in response to determining that the one or more obtained searches do not match the one or more criteria, monitoring the Peer-to-Peer network for other searches.

2. A method as is claimed in claim 1 wherein comparing the one or more obtained searches to the one or more criteria uses one of the following: compare, intrastring, fuzzy logic match, or other comparison technique.

3. A method as is claimed in claim 1 is performed by C++ or Visual Basic program code.

4. A method as is claimed in claim 1 wherein issuing the one or more new searches based on the updated criteria further comprises: sending a TCP/IP packet with the one or more new searches to a network node on the Peer-to-Peer network.

5. A method as is claimed in claim 1 wherein the list is stored in a database, a computer program, memory, or suitable storage device.

6. A method as is claimed in claim 1 further comprising collecting a fee for providing access to the list.

7. A method as is claimed in claim 1 further comprising providing the list of the resultant information to an organization or individual as evidence that access to sensitive or private information is being allowed, via searching the Peer-to-Peer network, resulting in risks to the organization or individual.

8. A network node to execute instructions for computer program code to create a list of searched information on a Peer-to-Peer network, comprising:
   a network node containing computer program code configured to:
   (1) obtain one or more searches from one or more messages broadcast on a Peer-to-Peer network;
   (2) determine if the one or more obtained searches match one or more criteria, in which the one or more criteria is one of: a predefined keyword, set of keywords, or a subset of keywords that is indicative of a suspicious individual who is searching for information referring to an individual, organization, group, or other identifiable entity;
   (3) in response to determining that the one or more obtained searches match the one or more criteria:
      update the one or more criteria to include variations of the one or more obtained searches by employing account punctuation, pluralization, and other variations of the searches to update the one or more criteria,
      issue one or more new searches to the Peer-to-Peer network based on the updated criteria, the one or more new searches being different from the one or more obtained searches,
      determine resultant information associated with the one or more new searches, and
      create a list of the resultant information in a database, the resultant information comprising one or more of: an organization's name, information related to the organization, an individual's name, information related to the individual; and
   (4) in response to determining that the one or more obtained searches do not match the one or more criteria, monitor the Peer-to-Peer network for other searches.

9. A network node as is claimed in claim 8 wherein the network node uses one of the following: compare, intrastring, fuzzy logic match, or other comparison technique to compare the one or more obtained searches to the one or more criteria.

10. A network node as is claimed in claim 8 wherein the network node creates a list of searched information by using C++ or Visual Basic program code.

11. A network node as is claimed in claim 8 wherein the network node is further configured to send a TCP/IP packet with the one or more new searches to a communications network to determine resultant information.

12. A network node as is claimed in claim 8 wherein the list is stored in a database, a computer program, memory, or suitable storage device.

13. A network node as is claimed in claim 8 wherein the network node is further configured to identify a security risk based on the one or more new searches.

14. A non-transitory carrier medium comprising a computer storage medium having computer readable code for controlling a processor to ensure execution of postprocessing logic for a subject computer program routine, by:
  obtaining one or more searches from one or more messages broadcast on a Peer-to-Peer network;
  determining if the one or more obtained searches match one or more criteria, in which the one or more criteria is one of: a predefined keyword, set of keywords, or a subset of keywords that is indicative of a suspicious individual who is searching for information referring to an individual, organization, group, or other identifiable entity;
    in response to determining that the one or more obtained searches match the one or more criteria,
      updating the one or more criteria to include variations of the one or more obtained searches, the variations of the one or more obtained searches including account punctuation, pluralization, and other variations of the one or more searches,
    issuing one or more new searches to the Peer-to-Peer network based on the updated criteria, the one or more new searches being different from the one or more obtained searches,
    determining resultant information associated with the one or more new searches, and
    creating a list of the resultant information for analysis, the resultant information comprising one or more of: an organization's name, information related to the organization, an individual's name, information related to the individual; and
  in response to determining that the one or more obtained searches do not match the one or more criteria, monitor the Peer-to-Peer network for other searches.

* * * * *